(12) United States Patent
Pan et al.

(10) Patent No.: US 11,389,842 B2
(45) Date of Patent: Jul. 19, 2022

(54) LIGHT SYSTEM FOR A SEWER CLEANING VEHICLE

(71) Applicant: Federal Signal Corporation, Oak Brook, IL (US)

(72) Inventors: Jing Pan, Naperville, IL (US); Desmond Williams, Algonquin, IL (US); Nathan T. Mina, Lake in the Hills, IL (US)

(73) Assignee: Federal Signal Corporation, Oak Brook, IL (US)

( * ) Notice: Subject to any disclaimer, the term of this patent is extended or adjusted under 35 U.S.C. 154(b) by 0 days.

(21) Appl. No.: 17/003,237

(22) Filed: Aug. 26, 2020

(65) Prior Publication Data

US 2021/0129196 A1    May 6, 2021

Related U.S. Application Data

(60) Provisional application No. 62/983,838, filed on Mar. 2, 2020, provisional application No. 62/893,576, filed on Aug. 29, 2019.

(51) Int. Cl.
| | |
|---|---|
| *B08B 9/032* | (2006.01) |
| *B08B 9/035* | (2006.01) |
| *B08B 13/00* | (2006.01) |
| *E03F 9/00* | (2006.01) |
| *F21V 21/38* | (2006.01) |
| *F21V 21/15* | (2006.01) |

(Continued)

(52) U.S. Cl.
CPC ............ *B08B 9/0321* (2013.01); *B08B 9/035* (2013.01); *B08B 13/00* (2013.01); *B60P 3/2245* (2013.01); *B60P 3/2265* (2013.01); *E03F 9/007* (2013.01); *F21V 21/008* (2013.01); *F21V 21/15* (2013.01); *F21V 21/38* (2013.01); *B08B 2209/032* (2013.01)

(58) Field of Classification Search
CPC ........ B08B 13/00; B60P 3/224; B60P 3/2245; B60P 3/2265; E03F 9/007; F21S 9/02
See application file for complete search history.

(56) References Cited

U.S. PATENT DOCUMENTS

| | | |
|---|---|---|
| 2,971,259 A | 2/1961 | Hahnau et al. |
| 3,591,926 A | 7/1971 | Trice, Jr. |
| 3,739,089 A | 6/1973 | Latall |
| | (Continued) | |

FOREIGN PATENT DOCUMENTS

| | | | | |
|---|---|---|---|---|
| WO | 03087732 A2 | 10/2003 | | |
| WO | WO 2021/058119 | * | 4/2021 | ............... F21S 4/269 |

*Primary Examiner* — Zheng Song
(74) *Attorney, Agent, or Firm* — Merchant & Gould P.C.

(57) ABSTRACT

A vehicle includes at least one hose extending from the vehicle and configured to extend below ground through a manhole, and a light system. The light system includes a storage member, such as a retractable reel, coupled to the vehicle, a flexible line wrapped at least partially around the storage member, and a light source coupled to the flexible line. The storage member is adapted to selectively extend and retract the light source together with the hose below ground, and the light source is storable on the vehicle adjacent the storage member. The light source has a self-contained power source. In some systems, the flexible line and/or the light source are removable from the vehicle so they can be moved to a remote location from the vehicle.

17 Claims, 7 Drawing Sheets

(51) Int. Cl.
*B60P 3/22* (2006.01)
*F21V 21/008* (2006.01)

(56) References Cited

U.S. PATENT DOCUMENTS

| | | | |
|---|---|---|---|
| 3,832,724 A | 8/1974 | Duval | |
| 3,879,132 A | 4/1975 | Myeress | |
| 3,943,410 A | 3/1976 | Kalberer et al. | |
| 3,958,080 A | 5/1976 | Schadler | |
| 4,586,741 A | 5/1986 | Muti | |
| 5,195,823 A * | 3/1993 | Sidabras | F21V 21/06 362/427 |
| 5,663,758 A | 9/1997 | Linville | |
| 5,946,767 A * | 9/1999 | Sinz | E03F 7/10 15/302 |
| 5,988,101 A | 11/1999 | Jacobs et al. | |
| 7,164,476 B2 | 1/2007 | Shima et al. | |
| 7,172,150 B1 | 2/2007 | Hutchison, II et al. | |
| 7,480,041 B2 | 1/2009 | Lindner | |
| 7,651,242 B1 * | 1/2010 | Guerrant | F21V 21/22 362/286 |
| 8,172,419 B1 * | 5/2012 | Gasparre | F21V 21/0885 362/103 |
| 8,172,434 B1 | 5/2012 | Olsson | |
| 8,721,110 B2 | 5/2014 | Luo | |
| 9,541,432 B2 | 1/2017 | Kertesz et al. | |
| 2003/0182754 A1 * | 10/2003 | O'Brien | E03F 9/00 15/302 |
| 2005/0128769 A1 * | 6/2005 | Gozum | F21L 14/02 362/581 |
| 2007/0202286 A1 | 8/2007 | Jacobs et al. | |
| 2016/0025284 A1 * | 1/2016 | Inman | F21S 4/24 362/549 |
| 2020/0363284 A1 * | 11/2020 | Obillo | G01M 3/04 |

* cited by examiner

LIGHT SYSTEM FOR A SEWER CLEANING VEHICLE

CROSS REFERENCE TO RELATED APPLICATIONS

This application claims priority to U.S. Provisional Patent Application Ser. Nos. 62/893,576, filed Aug. 29, 2019 and 62/983,838, filed Mar. 2, 2020 the disclosure of which are incorporated herein by reference in their entirety.

BACKGROUND

Sewer pipes can be cleaned using a sewer cleaning vehicle, such as a sewer cleaning truck, which can perform jetting and vacuuming. Jetting is a process in which a high-pressure water hose with a sewer-jetting nozzle is pushed into the sewer pipes. High-pressure water is released from a water tank of a sewer cleaning vehicle to dislodge and flush away dirt. As the dirt is removed, the nozzle continues to move deeper into the sewer pipes. A sewer cleaning vehicle also uses vacuuming through which the dirt is extracted with a vacuuming system. All the solids and water removed are then disposed into a sludge tank.

These sewer pipes are often located below ground with access through a manhole. Because of the location of the sewer pipes, visibility can be difficult during the jetting and/or vacuuming operations. As such, a hand held light source is typically used to illuminate the manhole. However, this light source is positioned above ground, and during bright sunlight, glare and shading can prevent visibility down into the manhole. Additionally, the vacuuming operation can be a two-handed operation, and as such, a second operator may be needed to hold the light source. It is therefore desired to provide illumination to the lower portion of the manhole while allowing jetting and/or vacuuming operations.

SUMMARY

In general terms, the present disclosure relates to a light system for a sewer cleaning vehicle. In one possible configuration and by non-limiting example, the light system includes a storage member having a flexible line. Attached to the free end of the line is a light source. The light source is configured to be dropped into a manhole so as to provide illumination for sewer cleaning operations. Various aspects are described in this disclosure, which include, but are not limited to, the following aspects.

In one aspect, the technology relates to a vehicle including at least one hose extending from the vehicle and configured to extend below ground through a manhole, and a light system. The light system includes a storage member coupled to the vehicle, a flexible line held by the storage member, and a light source coupled to the flexible line. The storage member is adapted to selectively extend and retract the light source together with the hose below ground, and the light source is storable on the vehicle adjacent the reel.

In an example, the vehicle further includes a container mounted to the vehicle, the container is configured to store the light source. In another example, the container is positioned near the storage member, and in some examples, directly above the storage member. In yet another example, the vehicle further includes a control interface, and the storage member is disposed adjacent the control interface. In still another example, the light source is independently extendable relative to the at least one hose. In an example, the flexible line does not provide power to the light source. In another example, the flexible line includes a non-sparking rope. In yet another example, the light source has a self-contained power source. In still another example, the vehicle includes a sewer cleaning vehicle having a vacuum hose of the at least one hose and a high pressure hose of the at least one hose. In an example, the light source is independently extendable relative to both the vacuum hose and the high pressure hose. In another example, a hose reel is mounted on the vehicle and the high pressure hose is wrapped at least partially around the hose reel, and the storage member is coupled to the reel. The hose reel can be mounted at one of the front or the rear of the vehicle.

In yet another example, the vehicle includes a vacuum excavation vehicle, a catch basin cleaner, a water jetting vehicle, a water recycling vehicle, a vacuum truck, or an industrial vacuum loader. In still another example, the light source is substantially explosion-proof. In an example, the light source is water resistant. In another example, the light source includes a wide angle lens.

In another aspect, the technology relates to a sewer cleaning vehicle including a high pressure hose coupled to the sewer cleaning vehicle and configured to extend below ground and into a manhole, a vacuum hose extending from the front of the sewer cleaning vehicle and configured to extend below the ground and into the manhole, and a light system coupled to the front of the sewer cleaning vehicle. The light system includes a storage member, a flexible line extending from the storage member, and a light source coupled to the flexible line. The light source is selectively extendable below the ground and into the manhole independently from both the high pressure hose and the vacuum hose.

In an example, the high pressure hose includes a nozzle disposed on its free end, and when the high pressure hose is in a stored configuration on the sewer cleaning vehicle, the storage member is positioned proximate the nozzle. In another example, the sewer cleaning vehicle further includes a control interface mounted at the front of the sewer cleaning vehicle, and the storage member is located directly beside the control interface.

In another aspect, the technology relates to a method for cleaning a sewer line. The method includes positioning a sewer cleaning vehicle proximate a manhole; extending a light source mounted on the sewer cleaning vehicle below ground and into the manhole, wherein the light source is coupled to the flexible line wrapped around a storage member; and independently from the light source, extending a high pressure hose below the ground and into the manhole.

In an example, the method also includes independently, from both the light source and the high pressure hose, extending a vacuum hose below the ground and into the manhole.

In another aspect, a vehicle is provided comprising at least one hose extending from the vehicle and configured to extend below ground through a manhole; and a light system comprising a storage member coupled to the vehicle; a flexible line removably held by the storage member; and a light source removably coupled to the flexible line; wherein one of the flexible line or the light source is removable from the vehicle to be able to be moved to remote manholes.

The vehicle can further including an anchoring member secured to the flexible line to allow the flexible line to be removably fixed to a location remote from the vehicle.

In some embodiments, the anchoring member comprises one of a magnet, brick, sandbag, tool, hook, or latch.

In another aspect, a method for cleaning a sewer line is provided comprising: providing a sewer cleaning vehicle having a high pressure hose stored thereto; removing one of a light source or a flexible line secured to the light source from storage on the vehicle; and illuminating an interior of the manhole by lowering the light source below ground and through the manhole.

The step of removing one of a light source or a flexible line can include removing the flexible line from the vehicle and then securing the flexible line using an anchor member remote from the vehicle.

The step of securing the flexible line may include using a magnet as the anchor member to removably secure the flexible line to a manhole cover.

The step of securing the flexible line can include using one of a brick, sandbag, tool, hook, or latch as the anchor member to removably secure the flexible line to a location remote from the vehicle.

The step of removing one of a light source or a flexible line can include removing the light source and removably securing the light source to a second flexible line remote from the vehicle.

The step of illuminating an interior of the manhole can include illuminating using the light source with a self-contained power source.

DETAILED DESCRIPTION

Figure 1:
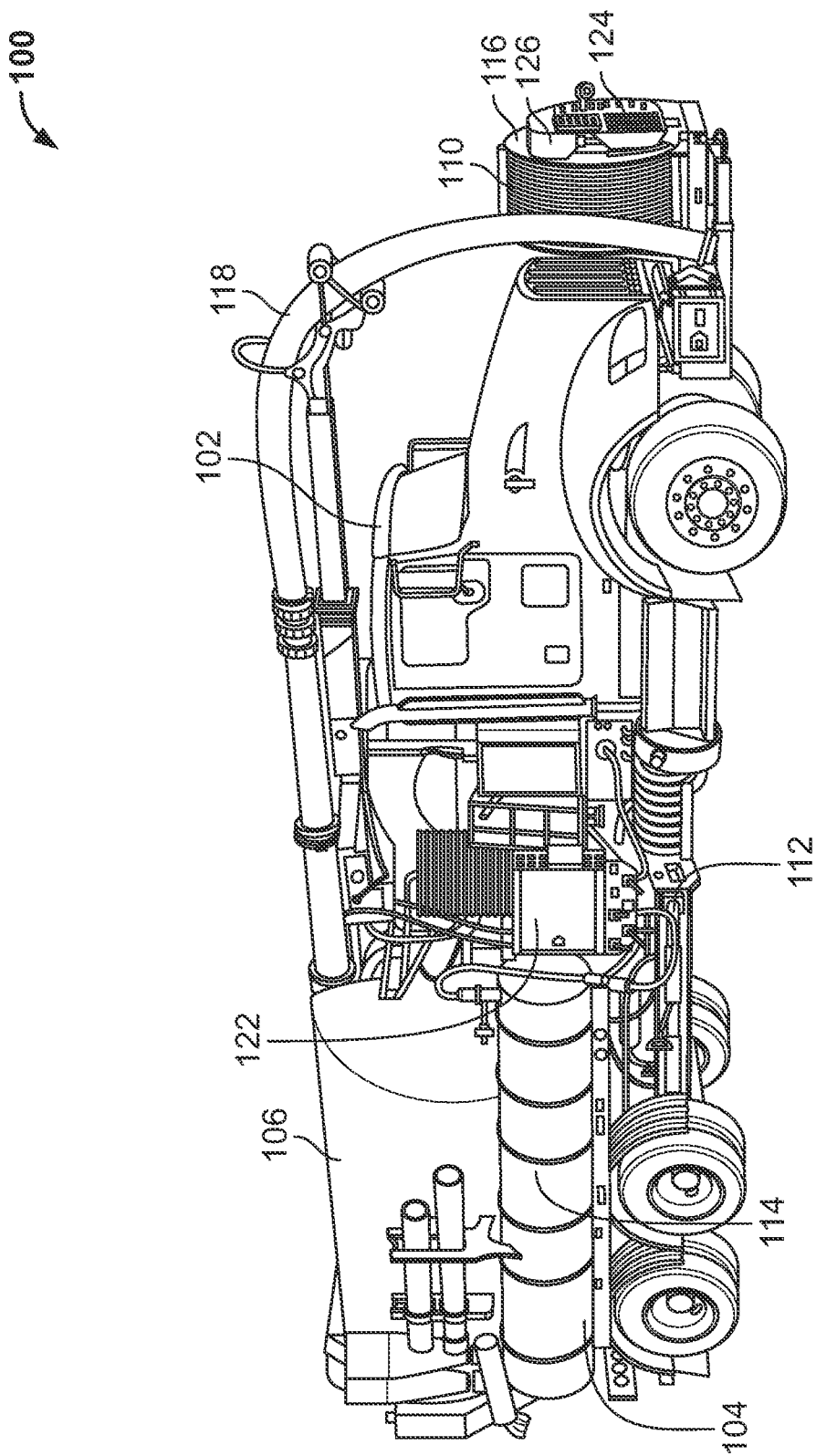
FIG. 1 is a front perspective view of an exemplary sewer cleaning vehicle in accordance with the present disclosure.

Various embodiments will be described in detail with reference to the drawings, wherein like reference numerals represent like parts and assemblies throughout the several views.

This disclosure describes light systems for sewer cleaning vehicles. Sewer lines and pipes are generally located below ground and accessed through a manhole. As such, visibility is often difficult. The light system can be attached to a front of the sewer cleaning vehicle adjacent the jetting and vacuuming components for ease of use. The light system includes a light source that can be independently lowered into the manhole to provide illumination during the cleaning operations. The light source is coupled to a flexible line so that it can be easily maneuvered around the jetting and vacuuming components during the cleaning operations. The light system allows for hands-free illumination of the manhole so that the operator can perform the jetting and vacuuming operations without assistance. In aspects, the light system is explosion rated because sewers and manholes may include toxic or flammable hazards. In other aspects, the light system is mounted on the sewer cleaning vehicles for ease of use and transportation.

Figure 2:
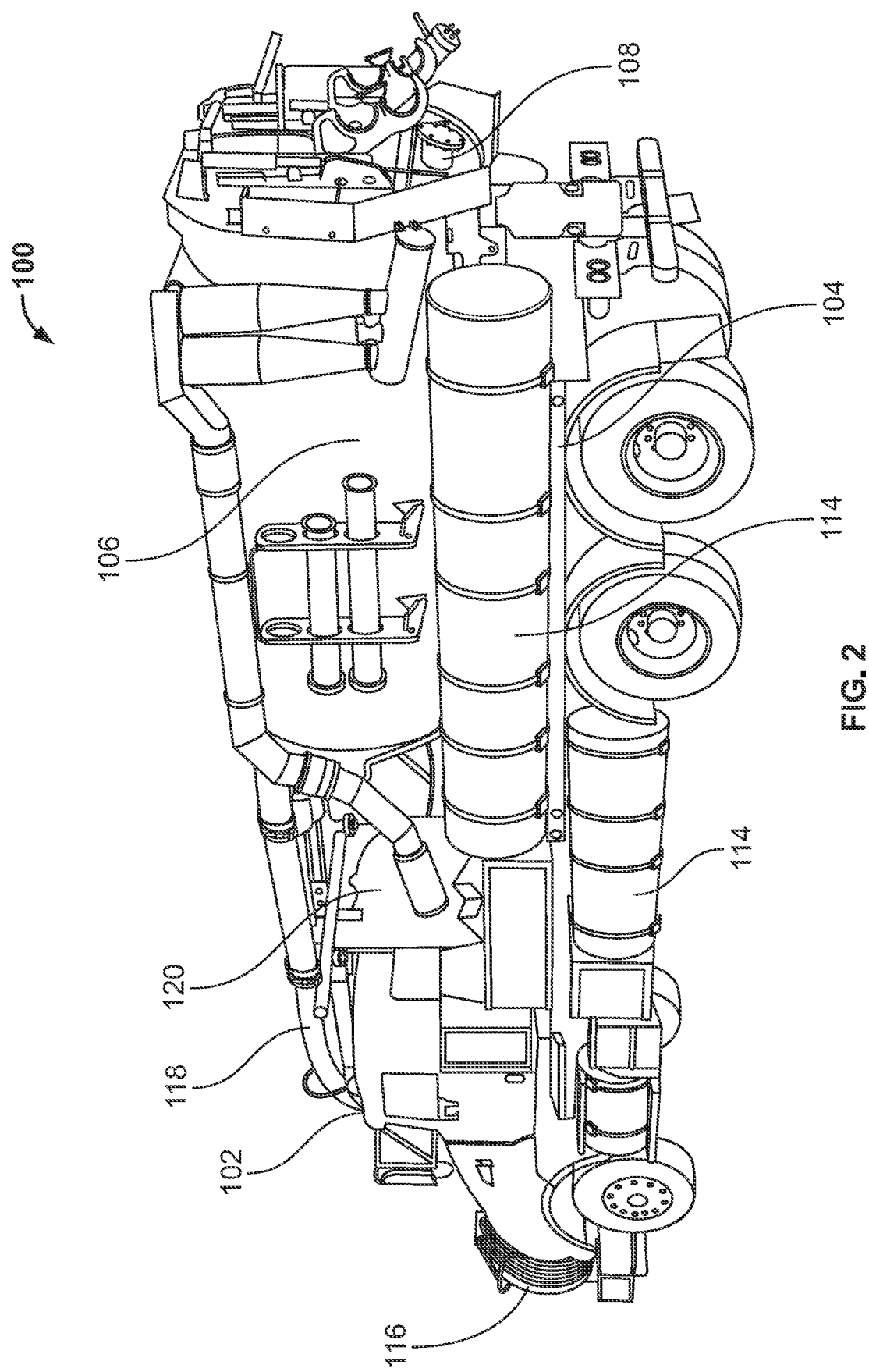
FIG. 2 is a back perspective view of the sewer cleaning vehicle of FIG. 1.
Figure 3:
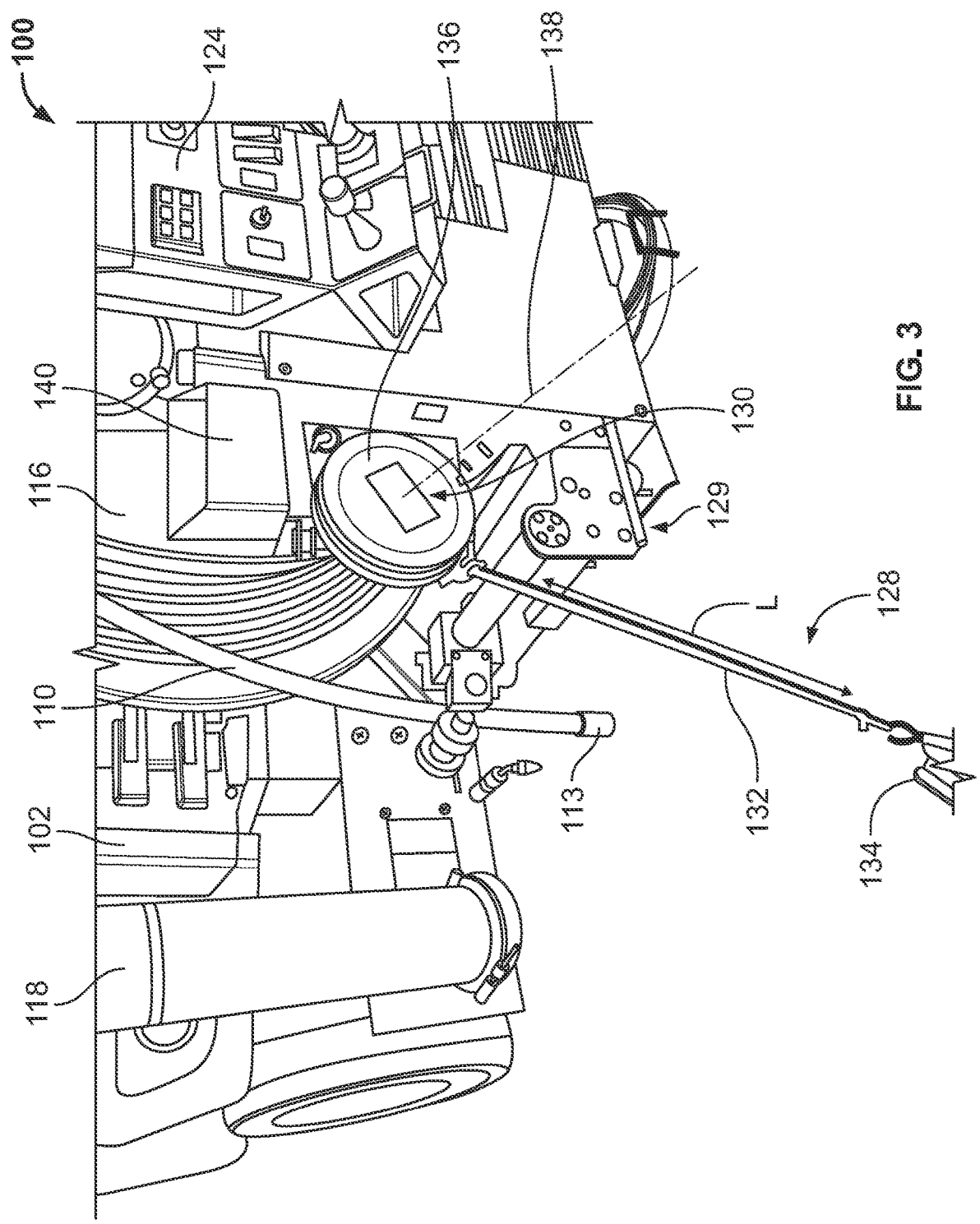
FIG. 3 is a partial enlarged front view of the sewer cleaning vehicle of FIG. 1.

FIG. 1 is a front perspective view of an exemplary sewer cleaning vehicle 100 in accordance with the present disclosure. FIG. 2 is a back perspective view of the sewer cleaning vehicle 100. FIG. 3 is a partial enlarged front view of the sewer cleaning vehicle 100. Referring concurrently to FIGS. 1-3, the sewer cleaning vehicle 100 is configured as a truck that is capable of providing jetting and vacuuming. While the sewer cleaning vehicle 100 is illustrated and described herein, it should be appreciated that components (e.g., a light system) can be used with any other service vehicle as required or desired. For example, vacuum excavation vehicles, catch basin cleaners, water jetting vehicles, water recycling vehicles, vacuum trucks, industrial vacuum loaders, or any other service vehicles for various services.

The sewer cleaning vehicle 100 includes a cab 102 and a bed 104 extending rearwards from the cab 102. A debris tank 106 is mounted to the bed 104. The debris tank 106 is used to collect debris or sludge removed from the sewer pipes being cleaned. In some examples, the debris tank 106 is pivotally mounted to the bed 104 adjacent the rear of the bed 104 such that the front of the debris tank 106 can lift off of the bed 104 and be tilted for dumping the debris collected in the debris tank 106. The rear end of the debris tank 106 can include a pivotally mounted door 108 coupled to the remainder of the debris tank 106.

At least one high pressure hose 110 is coupled at one end to a high pressure water pump 112. The other end of the hose 110 has a nozzle 113 for high velocity spraying into sewer pipes to be cleaned. The water pump 112 supplies water from one or more water tanks 114 to the hose 110. By "high pressure hose," it is meant a hose that extends into a sewer line such that water can be jetted into the sewer line. The hose 110 can be mounted to a reel 116. In some examples, the reel 116 is arranged at the front of the vehicle 100 and positioned ahead of the cab 102. By "front," it is meant the forward part of the vehicle 100 and ahead of the cab 102, so that the cab 102 is between the front and the bed 104 of the vehicle 100. In other examples, the reel 116 can be positioned at any other location on the vehicle 100 as required or desired. For example, on the bed 104, along a side (e.g., right or left) of the vehicle 100, at a rear of the vehicle 100, behind the cab 102, etc.

A vacuum hose 118 can be located adjacent the hose 110. An end of the vacuum hose 118 is fluidly coupled to the debris tank 106, and the other end of the vacuum hose 118 is configured to extend down into a desired manhole. A vacuum pump 120 is provided at the vehicle 100 and configured to create a negative pressure inside of the debris tank 106. In some examples, water or another fluid can be used to help the vacuum pump 120 create a seal and form the vacuum. Water sprayed inside the sewer pipe being cleaned through the nozzle of the hose 110 is sucked up with debris from the pipe through the vacuum hose 118 and deposited into the debris tank 106. By "vacuum hose," it is meant a hose that extends into a manhole such that debris can be removed. In some examples, the high pressure hose 110 has a smaller diameter than the vacuum hose 118.

The water pump 112 operates to pump water from at least one of the water tanks 114. The water tanks 114 are mounted to the vehicle 100 and configured to contain water for cleaning sewer pipes. In some examples, a plurality of water tanks 114 are provided for higher water capacity of the vehicle. The water tanks 114 can be arranged in the vehicle 100 in various configurations, depending on various considerations, such as for ease of use or optimal weight distribution. In some embodiments, at least one of the water tanks 114 is configured to have a different dimension than the other water tanks 114. Different dimensions of water tanks 114 may or may not have a same capacity. In other examples, all the water tanks 114 are configured to have an identical dimension having a same capacity. In addition, at least one of the water tanks 114 can be arranged at a different level than the other water tanks 114. The water tanks 114 can be made of various materials. In one example, the water tanks 114 are made of aluminum for corrosion resistance and weight reduction. In some examples, at least some of the water tanks 114 are in fluid communication. In other examples, all of the water tanks 114 are in fluid communication so that the entire group of water tanks 114 operates as a single water tank or single water supply.

The vehicle 100 can further include an emergency stop interface 122 that provides an interface for an operator to disable one or more elements and devices of the vehicle 100. In some examples, the emergency stop interface 122 is configured to enable an operator to stop at least one of the water pump, vacuuming function, and hydraulic functions, and to return the chassis engine to idle so that the unit comes to a safe condition without stopping the engine.

In some examples, the vehicle 100 includes a control interface 124 that provides control elements for operating and controlling various elements and devices of the vehicle 100. In this example, the control interface 124 is arranged at the front of the vehicle 100 to make it convenient to operate. The control interface 124 can include physical control elements, such as buttons, switches, levers, selectors, and joysticks. In other examples, the control interface 124 includes electronic control elements. For example, the control interface 124 can be integrated with a display device, such as a touch sensitive display screen, and include graphical user interface control elements or widgets. In the example, the control interface 124 can be mounted to the front of the reel 116 of the high pressure hose 110.

The vehicle 100 can include a monitoring device 126 configured to enable an operator to access various operational information. Examples of such operational information include water flow, pressure, engine speed, vacuum system speed, hose footage, and maintenance information. In some examples, the monitoring device 126 operates to diagnose fault codes and warn the operator when an unsafe condition occurs. The monitoring device 126 can include a safety interlock circuit which ensures proper sequencing of functions to prevent an accidental misuse of equipment, thereby protecting the system and the operator. The monitoring device 126 can further include a diagnostic circuit that allows the operator to perform, or automatically performs, troubleshooting issues. In the example, the monitoring device 126 can be positioned adjacent to the control interface 124 so that the operator conveniently manipulate various functions of the system at the same place. In the illustrated example, the monitoring device 126 and the control interface 124 are arranged at the front of the vehicle 100.

In the example, the vehicle 100 also includes a light system 128. The light system 128 includes a storage member 129. The storage member 129 can be embodied in many different forms, and in the example shown, is embodied as a retractable reel 130 coupled to the vehicle 100. A flexible line 132 is stored on the storage member 129. When the storage member 129 is a retractable reel, it is coiled or wrapped at least partially around the retractable reel 130. A light source 134 is coupled to the flexible line 132, at for example, an end of the flexible line 132. The light system 128 is configured to selectively extend and retract the light source 134 from the vehicle 100 so that the light source 134 can be placed within the manhole independently from both the high pressure hose 110 and the vacuum hose 118 and illuminate the lower portion of the manhole. The storage member 129 can be located in a variety of places with respect to the vehicle 100, including the front (as depicted in FIG. 3) or the rear, or any other convenient location on the vehicle 100.

In the example shown in which the storage member 129 is retractable reel 130, the retractable reel 130 includes a housing 136 with a rotatable drum (not shown) disposed therein. One end of the flexible line 132 is wrapped at least partially around the rotatable drum. The retractable reel 130 enables the flexible line 132 to retract and wrap around the rotatable drum so as to store at least a portion of the flexible line 132 within the housing 136. Additionally, the retractable reel 130 enables the flexible line 132 to extend and unwrap (uncoil) from the rotatable so as to draw a required or desired length L of the flexible line 132 out of the housing 136. In some examples, the rotatable drum may have a biasing mechanism so as to assist retracting the flexible line 132. In an aspect, the biasing mechanism may be sized to accommodate the weight of the light source 134 attached to the other end of the line 132.

In the example depicted, the storage member 129 is mounted to the front of the hose reel 116. In some examples, when the storage member 129 comprises retractable reel 130, a rotational axis 138 of the retractable reel 130 can be oriented substantially parallel to, but offset from, a rotational axis of the hose reel 116. The retractable reel 130 can be located directly beside the control interface 124. By "directly beside," it is meant that the reel 130 is located within 3 feet, and in many cases under 24 inches of the interface 124. This position of the light system 128 on the vehicle 100, places the components of the light system 128 proximate to the nozzle 113 of the high pressure hose 110 and the free end of the vacuum hose 118 when the hoses 110, 118 are in a stored configuration as illustrated in FIG. 3. As such, during sewer cleaning operations, all of the tools that are extended down into the manhole are positioned close to one another on the vehicle 100 and this increases the efficiency of jetting and/or vacuuming operations.

In other examples, the storage member 129 may be electronically controlled (e.g., the extension and retraction operations). In this example, the retractable reel 130 can be communicatively coupled to the control interface 124 and include an electric motor such that the control interface 124 can be used to lower and raise the light source 134 from the manhole as required or desired.

The flexible line 132 can be a non-sparking rope that does not provide power to the light source 134. By "non-sparking," it is meant material that reduces the generation of sparks either by friction (e.g., impact with the manhole or sewer line) or by chemical reaction. Because sewer systems can present confined space hazards, such as low oxygen, toxic or flammable gases, and chemicals, this component construction reduces the possibility of manhole explosion accidents. Also, electrical current is eliminated from being channeled through the line 132. Additionally, the non-sparking rope is water resistant and can be used during the jetting operations that produces jetting water and water mist within the manhole. In other examples, the flexible line 132 can be an electrical cord that is sealed for hazardous spaces so that the line 132 is used to power the light source 134.

In the example, the line 132 is also flexible. This enables the line 132 to be coiled or wrapped within the retractable reel 130 for storage. Additionally, the flexible line 132 enables the light source 134 to be easily maneuverable around the high pressure hose 110 and/or the vacuum hose 118 within the manhole so as to not obstruct the jetting and vacuuming operations. In some examples, the flexible line 132 can be made from plastics or natural fibers.

Opposite of the storage member 129, the light source 134 is coupled to the flexible line 132. In preferred embodiments, the light source 134 can be at or near a free end of the flexible line 132 distal from the storage member 129. In many preferred implementation, the light source 132 can be removably coupled to the line 132. The light source 134 is separate from both the high pressure hose 110 and the vacuum hose 118 such that the light source 134 can be independently dropped into the manhole. Because sewer systems contain confined space hazards, the light source 134 can be substantially explosion-proof. By "explosion-proof," it is meant that an enclosure of the light source 134 is able to contain an explosion originating within the enclosure and prevent sparks from within the enclosure from igniting vapors, gases, dust, or fibers in the air surrounding it. For example, the light source 134 can be in compliance with National Electric Code (NEC) class 1, division 1. Additionally, the light source 134 is substantially water resistant because of the jetting operations. In an aspect, the light source 134 can be a rechargeable LED light with a self-contained power source. By "self-contained," it is meant that the light source 134 is complete with the power source and it is enclosed therein. In some examples, the light source 134 can have a wide angle lens so as to increase the illumination area within the manhole. In other examples, the light source 134 can be powered by an electrical line 132. It should be appreciated that the light source 134 can have any light intensity, light pattern, power charge means, etc. to enable the light source 134 to function as described herein.

A container 140, which can be in the form of a box or basket, can be mounted to the vehicle 100, for example, on the hose reel 116 so that the light source 134 can be stored when the light system 128 is retracted. This allows for easy transport of the light system 128 when the vehicle 100 is moving. In the example of FIG. 3, the container 140 can be positioned above the retractable reel 130 on the vehicle 100. By "above," it is meant that the container 140 is at a higher level than the retractable reel 130, such that when the vehicle 100 is positioned in a normal operable state with all wheels on the ground, the reel 130 is located between the container 140 and the ground. In some examples, the container 140 may be at least partially directly above the retractable reel 130. By "directly above," it is meant that a longitudinal axis extending from the container 140 to the ground and generally perpendicular to the ground will pass through the reel 130. In an aspect, the container 140 can be an open-top container and cover-free. In another aspect, the container 140 can be a locking box for security purposes.

Figure 4:
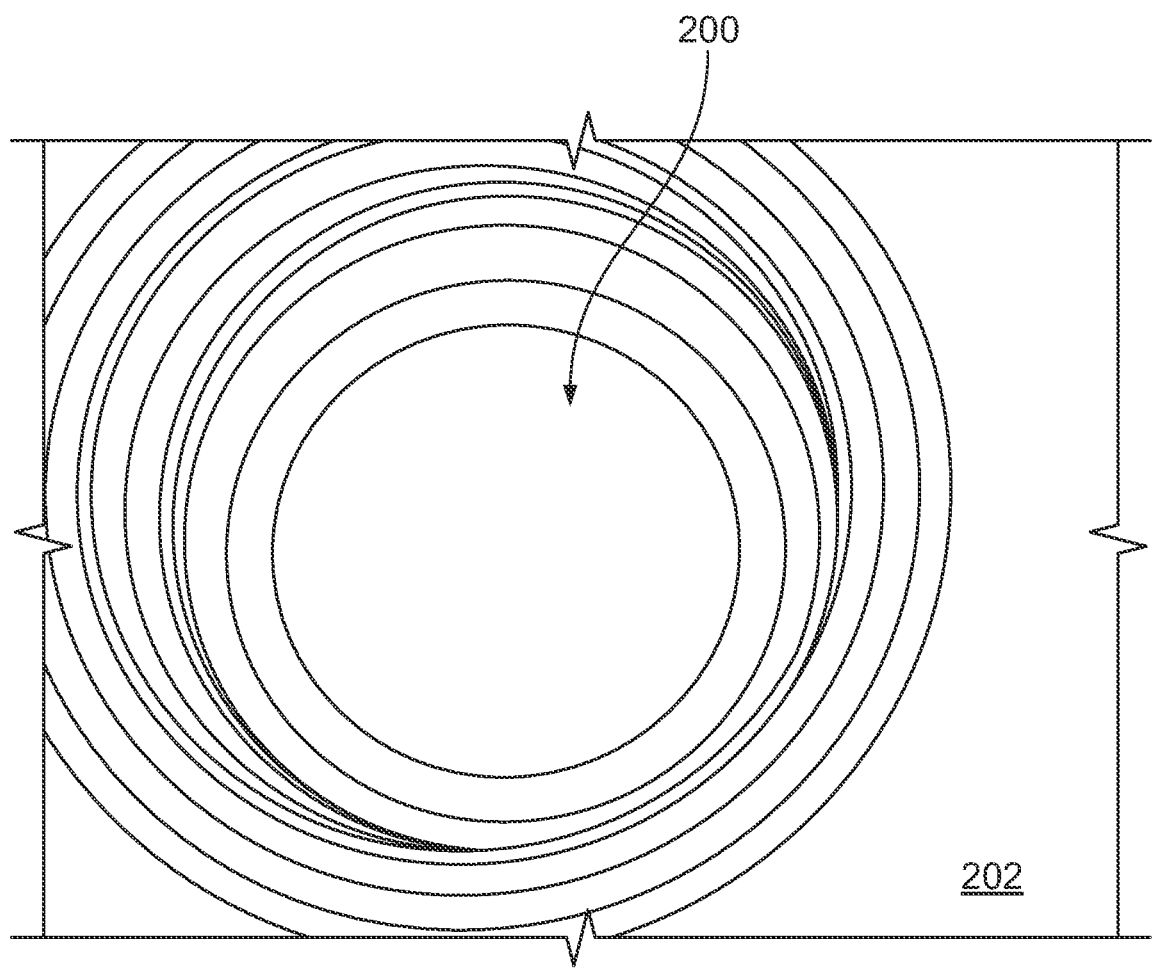
FIG. 4 is a top view of an exemplary manhole.

FIG. 4 is a top view of an exemplary manhole 200. The manhole 200 is an access point on a ground surface 202 (e.g., an asphalt street) to an underground sewer line. The sewer line is typically located at a depth below the ground surface (e.g., a depth of up to 30 feet), and since the sewer line is underground, visibility is difficult even in daylight. Using a hand held light keeps the light source above the ground surface 202 and bright sunlight glare and shading can prevent visibility down the manhole even with the use of the hand held light. Additionally, the hand held light can be difficult to use while performing the jetting and/or vacuuming operations. For example, the vacuuming operation is often a two-handed operation. A manhole cover (not shown) is often used to cover the manhole 200 and prevent unauthorized access.

Figure 5:
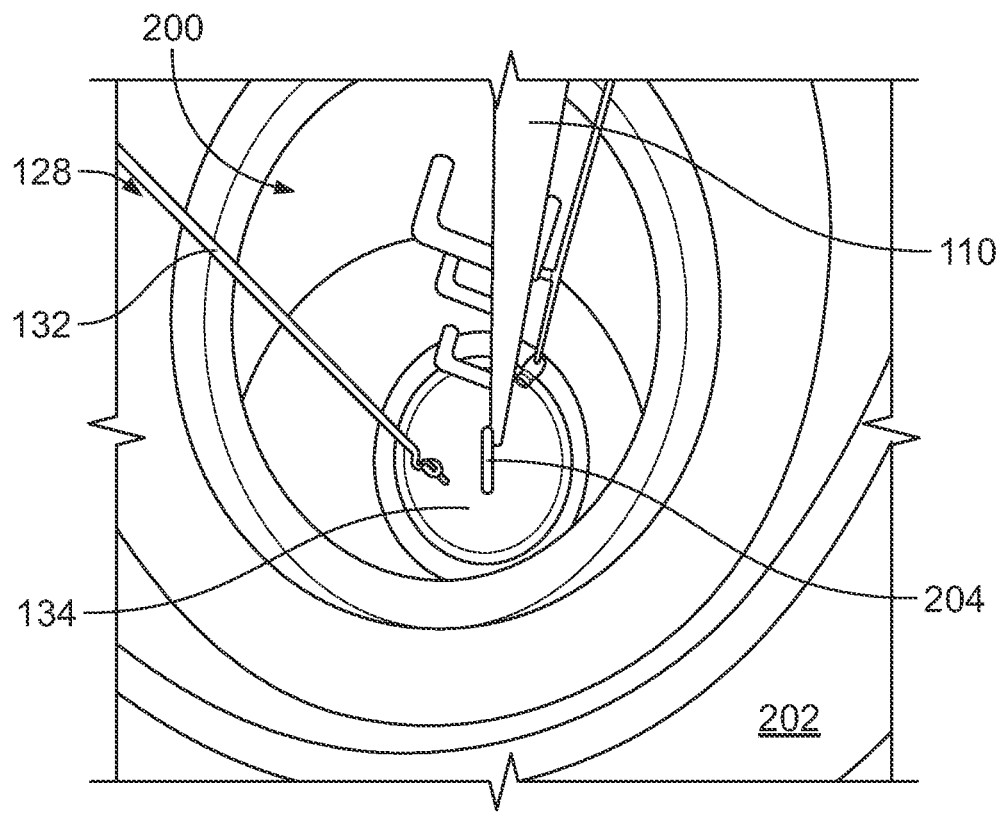
FIG. 5 is a top view of an illuminated manhole.

FIG. 5 is a top view of an illuminated manhole 200. As illustrated, the light source 134 is extended below the ground surface 202 and into the manhole 200. The light source 134 enables the bottom of the manhole 200 to be illuminated so that a sewer line 204 is visible and to increase cleaning efficiencies. Because the light source 134 is lowered into the manhole 200, the bottom of the manhole 200 and the sewer line 204 are visible from the ground surface 202 during all ambient light conditions.

Additionally, the storage member 129 (shown in FIG. 3) enables the length of the flexible line 132 to be selected so that the light source 134 can extend to any depth within the manhole 200 as required or desired. For example, the light source 134 can be lowered all the way to the sewer line 204. In other examples, the light source 134 can be positioned above the sewer line 204 (e.g., 1-2 feet) so that the light source 134 does not interfere with the cleaning processes. In further examples, the light source 134 can only be partially lowered into the manhole 200 as required or desired.

Once the light source 134 is positioned within the manhole 200, the light system 128 does not need an operator to operate as it can remain in the manhole during all cleaning operations. As such, the operator is free to perform other operations in the manhole 200 as required or desired. For example, the operator can set up the cleaning operations, observe the cleaning operations, and/or perform the jetting and vacuuming processes. As illustrated in FIG. 5, the high pressure hose 110 is also extended into the manhole 200 and separate from the light system 128. The light source 134 illuminates the lower portion of the manhole 200 while enabling a single operator to operate the high pressure hose 110 without needing to hold the light system 128. Because both the hose 110 and the light source 134 are disposed within the manhole 200 together, the flexible line 132 enables the light source 134 to be displaced by the hose 110 as required or desired for the jetting (or the vacuuming) operation. When the sewer operations are finished, the light source 134 can be retreated back to the vehicle and stored at the front.

Figure 6:
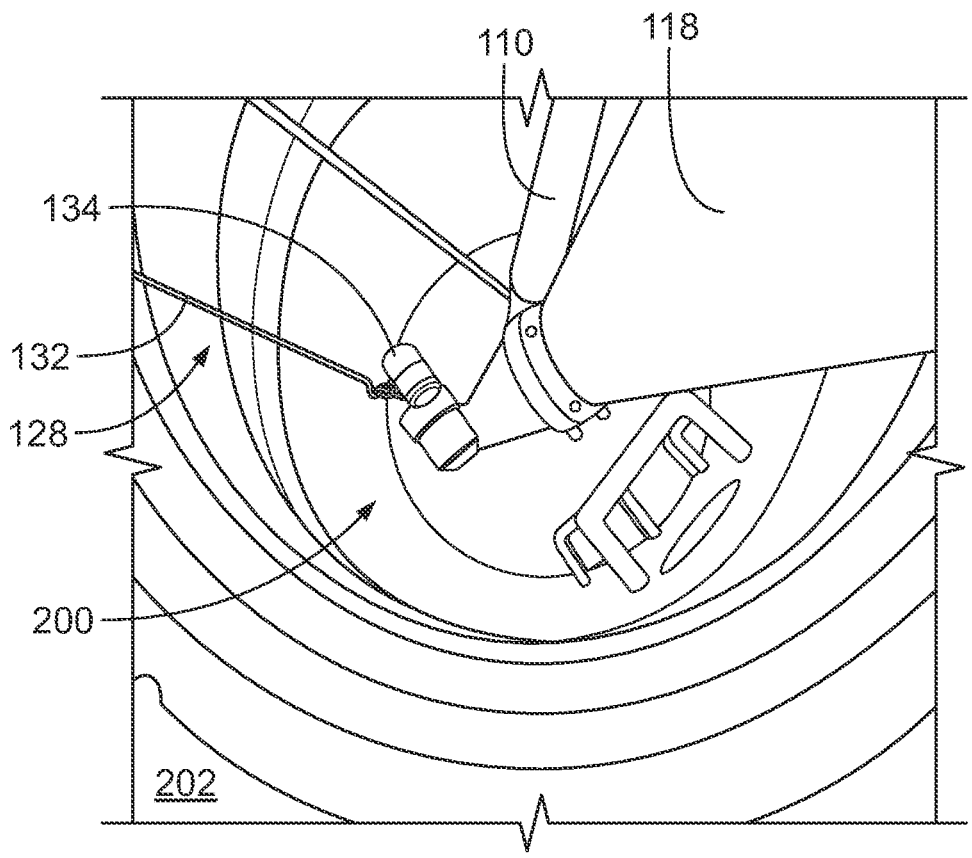
FIG. 6 is a top view of another illuminated manhole.

FIG. 6 is a top view of another illuminated manhole 200. Similar to the example described above in reference to FIG. 5, the light source 134 is extended below the ground surface 202 and into the manhole 200 so that the lower portion of the manhole 200 is visible and to increase cleaning efficiencies. In this example, the vacuum hose 118 is also extended below the ground surface 202 and into the manhole 200. Because the light system 128 does not require an operator (unlike a hand held light), the operator is free to easily jet and vacuum while being able to see the lower portion of the manhole 200.

It should be appreciated that while the light system 128 is described and illustrated as being coupled to a sewer cleaning vehicle, the light system 128 can be coupled to any other vehicle or operational structure for providing visibility below an operator's operating position as required or desired.

Figure 7:
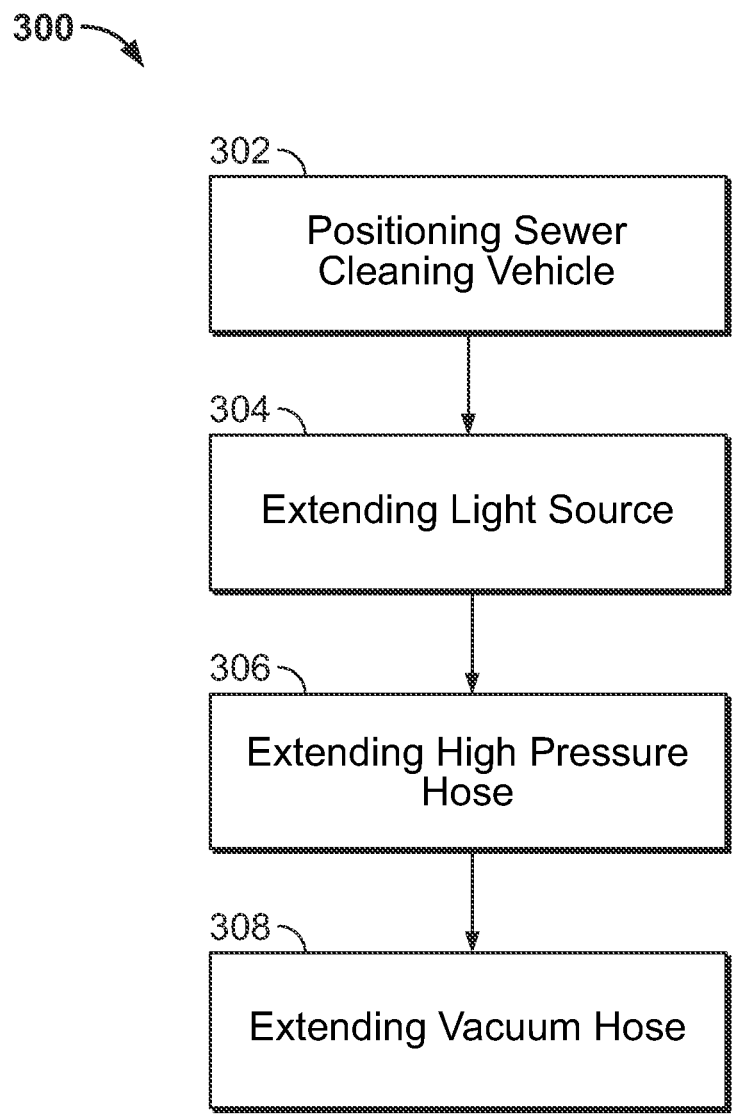
FIG. 7 illustrates a flowchart of an exemplary method for cleaning a sewer line.

FIG. 7 illustrated a flowchart of an exemplary method 300 for cleaning a sewer line. In examples, the method can be performed at least partially by the sewer cleaning vehicle 100 (shown in FIGS. 1-3). Although the method is primarily described with reference to the sewer cleaning vehicle, other devices can additionally or alternatively used to perform the method as required or desired.

In the example, the method 300 can begin by positioning the sewer cleaning vehicle proximate a manhole (operation 302). For example, a vacuum hose, a high pressure hose, and a light system are located proximate to one another on the vehicle so that that all three can be positioned close to, or directly above, the manhole. A light source mounted on the sewer cleaning vehicle can be extended below ground and into the manhole (operation 304). In an aspect, that light source is coupled to one end of a flexible line that is wrapped around a storage member. As such, the light source can be selectively lowered to a position within the manhole to illuminate the lower portion of the manhole as required or desired.

Additionally and independently from the light source, a high pressure hose can be extended below the ground and into the manhole (operation 306). The high pressure hose can be used to jet a sewer line via a nozzle with a high pressure fluid flow to dislodge and flush away dirt and debris. Then, a vacuum hose can additionally be extended below the ground and into the manhole (operation 308). The vacuum hose can be used to vacuum out any dirt and debris from the jetting operation. This vacuuming operation may not be needed for every cleaning process. In the example, a single operator can use the light source to illuminate the manhole and operate either hose with both hands. As such, another operator is not needed. Once the jetting and vacuuming operations are completed, the vacuum hose is moved back to its original position on the vehicle and then the high pressure hose is retracted. The light source is then brought up from the manhole and stored at the front of the vehicle.

Figure 8:
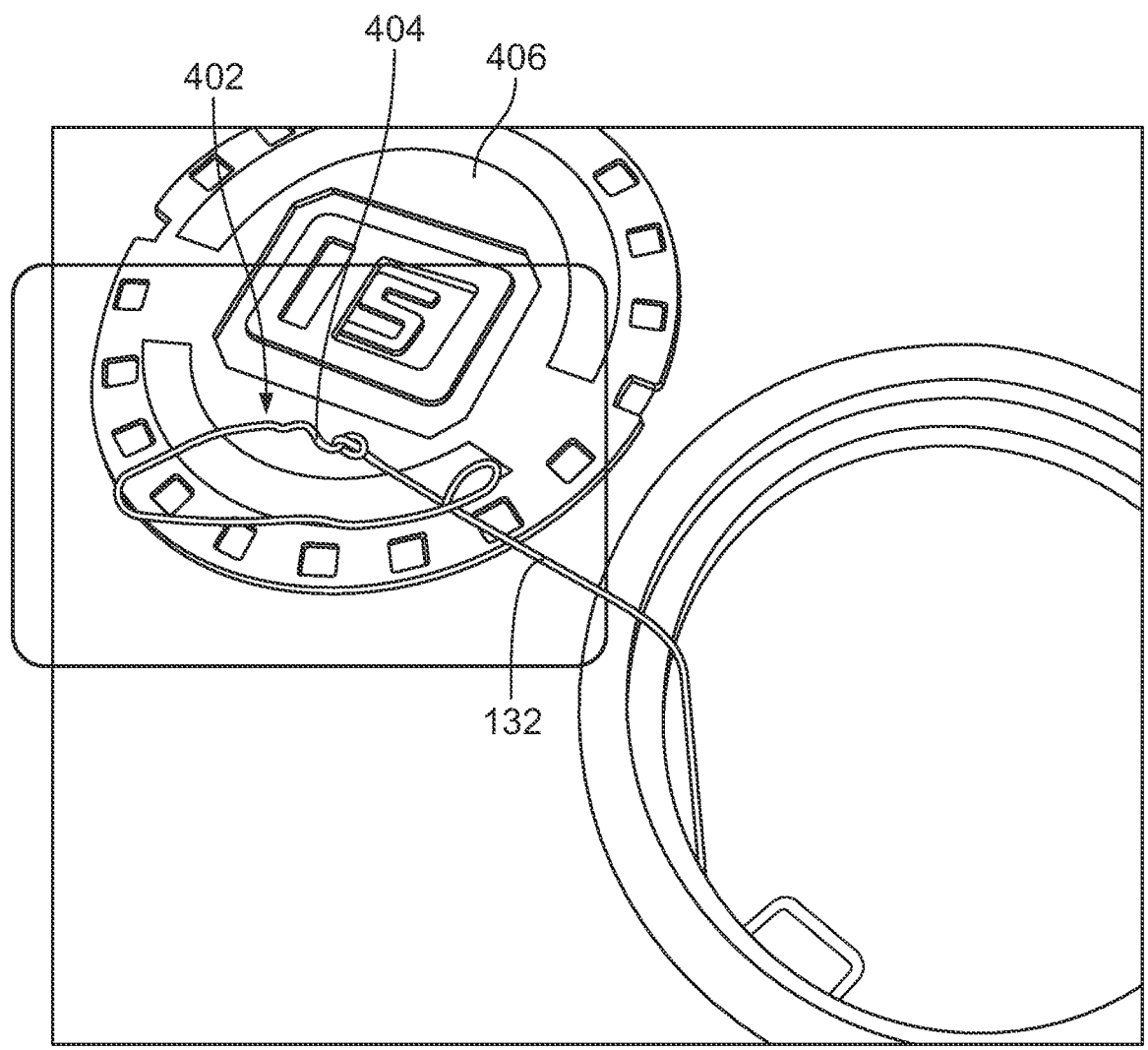
FIG. 8 is a top view of an illuminated manhole according to another embodiment.

FIG. 8 illustrates another embodiment. In the system of FIG. 8, flexible line 132 is removably held by the storage member 129, and the light source 134 is removably coupled to the flexible line. In use, one or both of the flexible line 132 or the light source 134 is removable from the vehicle 100 to be able to be moved to remote manholes 200.

In the system of FIG. 8, an anchoring member 402 is secured to the flexible line 132 to allow the flexible line 132 to be removably fixed to a location remote from the vehicle 100. The anchoring member 402 can include any type of mechanism to secured or fix the flexible line 132 remote from the vehicle 100.

For example, in the embodiment of FIG. 8, the anchoring member 402 includes a magnet 404. The magnet 404 is secured to the flexible line 132 so that the magnet 404 can then be magnetically connected to a heavy weight. In FIG. 8, the heavy weight is manhole cover 406. In other systems, the heavy weight can be any other heavy metal item, such as a tool, anvil, etc.

In other embodiments, the anchoring member 402 can be any item that is sufficiently heavy to provide an anchor to hold the line 132 with the light sources 134 in place. For example, the anchoring member 402 can be a brick, sandbag, or tool. In addition, the anchoring member 402 can include a hook or latch to allow the line 132 to be secured (anchored) to any fixed item, such as, for example, a fire hydrant, tree, fence post, or a portion of the vehicle 100.

In some systems, the light source 134 can be removed from the line 132 and secured to another line remote from the vehicle. Since the light source 134 is powered by a self-contained power source, it can be freely moved anywhere, and need not be near the vehicle 100.

The system of FIG. 8 can be used in a method. The method includes providing a sewer cleaning vehicle 100 having a high pressure hose 110 stored thereto. The method includes removing one of a light source 134 or a flexible line 132 secured to the light source 134 from storage on the vehicle 100. The method also includes illuminating an interior of the manhole 200 by lowering the light source 134 below ground and through the manhole 200.

In an example method, the flexible line 132 is removed from the vehicle 100 and then secured using an anchor member 402 remote from the vehicle 100. A magnet 404 can be used as the anchor member 402 to removably secure the flexible line 132 to a manhole cover 406.

In other methods, a brick, sandbag, tool, hook, or latch can be used as the anchor member 402 to removably secure the flexible line 132 to a location remote from the vehicle 100.

The method of can also include removing the light source 134 and removably securing the light source 134 to a second flexible line remote from the vehicle 100.

The step of illuminating an interior of the manhole includes illuminating using the light source 134 with a self-contained power source.

It is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. It must be noted that, as used in this specification, the singular forms "a," "an," and "the" include plural referents unless the context clearly dictates otherwise.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified examples and examples. In this regard, any number of the features of the different examples described herein may be combined into one single example and alternate examples having fewer than or more than all of the features herein described are possible.

While various examples have been described for purposes of this disclosure, various changes and modifications may be made which are well within the scope contemplated by the present disclosure. Numerous other changes may be made which will readily suggest themselves to those skilled in the art and which are encompassed in the spirit of the disclosure.

What is claimed is:

1. A vehicle comprising:
   at least one hose extending from the vehicle and configured to extend below ground through a manhole; and
   a light system comprising:
   a storage member coupled to the vehicle;
   a flexible line held by the storage member; and
   a light source coupled to the flexible line, wherein the storage member is adapted to selectively extend and retract the light source together with the at least one hose below ground, wherein the light source is storable on the vehicle adjacent the storage member, and wherein one of the flexible line or the light source is removable from the vehicle to be able to be moved to remote manholes.

2. The vehicle of claim 1, wherein the vehicle further comprises a container mounted to the vehicle, wherein the container is configured to store the light source.

3. The vehicle of claim 2, wherein the container is positioned near the storage member.

4. The vehicle of claim 2, wherein the container is positioned directly above the storage member.

5. The vehicle of claim 1, wherein the vehicle comprises a sewer cleaning vehicle, and wherein the sewer cleaning vehicle comprises a vacuum hose of the at least one hose and a high pressure hose of the at least one hose.

6. The vehicle of claim 5, further comprising a hose reel mounted on the vehicle and the high pressure hose is wrapped at least partially around the hose reel, wherein the storage member is coupled to the vehicle.

7. The vehicle of claim 6, wherein the hose reel is mounted at one of a front or a rear of the vehicle.

8. The vehicle of claim 5, wherein the light source is independently extendable relative to both the vacuum hose and the high pressure hose.

9. The vehicle of claim 1, wherein the vehicle further comprises a control interface, and wherein the storage member is disposed adjacent the control interface.

10. The vehicle of claim 1, wherein the light source is independently extendable relative to the at least one hose.

11. The vehicle of claim 1, wherein the flexible line does not provide power to the light source.

12. The vehicle of claim 1, wherein the flexible line comprises a non-sparking rope.

13. The vehicle of claim 1, wherein the light source has a self-contained power source.

14. The vehicle of claim 1, wherein the vehicle comprises a vacuum excavation vehicle, a catch basin cleaner, a water jetting vehicle, a water recycling vehicle, a vacuum truck, or an industrial vacuum loader.

15. The vehicle of claim wherein the storage member comprises a retractable reel.

16. A vehicle comprising:
at least one hose extending from the vehicle and configured to extend below ground through a manhole; and
a light system comprising:
 a storage member coupled to the vehicle;
 a flexible line removably held by the storage member; and
 a light source removably coupled to the flexible line;
 wherein one of the flexible line or the light source is removable from the vehicle to be able to be moved to remote manholes.

17. The vehicle of claim 16, further including an anchoring member secured to the flexible line to allow the flexible line to be removably fixed to a location remote from the vehicle; and wherein:
the anchoring member comprises one of a magnet, brick, sandbag, tool, hook, or latch;
the vehicle further comprises a container mounted to the vehicle,
the container is configured to store the light source; and
the vehicle comprises one of a sewer cleaning vehicle, a vacuum excavation vehicle, a catch basin cleaner, a water jetting vehicle, a water recycling vehicle, a vacuum truck, or an industrial vacuum loader.

* * * * *